US010232351B2

(12) United States Patent
Kitao et al.

(10) Patent No.: US 10,232,351 B2
(45) Date of Patent: Mar. 19, 2019

(54) METHOD FOR PRODUCING CORE-SHELL CATALYST

(71) Applicant: TOYOTA JIDOSHA KABUSHIKI KAISHA, Toyota-shi, Aichi-ken (JP)

(72) Inventors: Noriyuki Kitao, Shizuoka-ken (JP); Nobuo Honma, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 66 days.

(21) Appl. No.: 15/515,037

(22) PCT Filed: Aug. 7, 2015

(86) PCT No.: PCT/JP2015/072469
§ 371 (c)(1),
(2) Date: Mar. 28, 2017

(87) PCT Pub. No.: WO2016/051960
PCT Pub. Date: Apr. 7, 2016

(65) Prior Publication Data
US 2017/0209850 A1    Jul. 27, 2017

(30) Foreign Application Priority Data

Oct. 2, 2014  (JP) .................................. 2014-204304

(51) Int. Cl.
| *B01J 23/44* | (2006.01) |
| *B01J 37/04* | (2006.01) |
| *B01J 37/02* | (2006.01) |
| *B01J 37/34* | (2006.01) |

(Continued)

(52) U.S. Cl.
CPC ............... *B01J 23/44* (2013.01); *B01J 21/18* (2013.01); *B01J 23/8926* (2013.01);
(Continued)

(58) Field of Classification Search
CPC ... B01J 37/02; B01J 37/04; B01J 37/34; B01J 37/348; B01J 23/42; B01J 23/44; H01M 4/86; H01M 4/88; H01M 4/92
See application file for complete search history.

(56) References Cited

U.S. PATENT DOCUMENTS

2006/0134505 A1* 6/2006 Wang .................... B22F 1/025
429/506
2006/0135359 A1* 6/2006 Adzic ................. H01M 4/8657
502/326

(Continued)

FOREIGN PATENT DOCUMENTS

| JP | 2013-215701 A | 10/2013 |
| JP | 2013-239331 A | 11/2013 |

OTHER PUBLICATIONS

Machine translation of CN102836707A, publication date Dec. 26, 2012.*

(Continued)

*Primary Examiner* — Jun Li
(74) *Attorney, Agent, or Firm* — Hunton Andrews Kurth LLP

(57) ABSTRACT

To produce a core-shell catalyst with high catalytic activity for a short period of time. Disclosed is a method for producing a core-shell catalyst comprising a core containing palladium and a shell containing platinum and coating the core, the method comprising: supplying palladium-containing particles and a copper-containing material to an acid solution; stirring the acid solution with introducing an oxygen-containing gas into the acid solution; coating at least a part of a surface of the palladium-containing particles with copper by applying a potential that is nobler than the oxidation reduction potential of copper to the palladium-containing particles in a copper ion-containing electrolyte after the stirring; and then forming the shell by substituting (Continued)

the copper coating at least a part of the surface of the palladium-containing particles with platinum by bringing the palladium-containing particles into contact with a platinum ion-containing solution.

3 Claims, 3 Drawing Sheets

(51) Int. Cl.
| | |
|---|---|
| *B01J 21/18* | (2006.01) |
| *B01J 23/89* | (2006.01) |
| *B01J 35/00* | (2006.01) |
| *B01J 35/10* | (2006.01) |
| *H01M 4/92* | (2006.01) |

(52) U.S. Cl.
CPC ......... *B01J 35/008* (2013.01); *B01J 35/0013* (2013.01); *B01J 35/1019* (2013.01); *B01J 37/0221* (2013.01); *B01J 37/0225* (2013.01); *B01J 37/04* (2013.01); *B01J 37/348* (2013.01); *H01M 4/921* (2013.01); *H01M 4/925* (2013.01); *H01M 4/926* (2013.01)

(56) References Cited

U.S. PATENT DOCUMENTS

| | | | |
|---|---|---|---|
| 2010/0177462 A1* | 7/2010 | Adzic | B82Y 30/00 361/502 |
| 2012/0010069 A1* | 1/2012 | Takehiro | B01J 13/02 502/5 |
| 2013/0324394 A1* | 12/2013 | Shao | B01J 37/06 502/339 |
| 2015/0017565 A1* | 1/2015 | Adzic | H01M 4/8657 429/480 |
| 2015/0093681 A1* | 4/2015 | Monden | H01M 4/88 429/483 |
| 2015/0093682 A1 | 4/2015 | Kimura et al. | |

OTHER PUBLICATIONS

Machine translation of JP2011218278A, publication date Nov. 4, 2011.*

Machine translation of JP2012192334A, publication date Oct. 10, 2012.*

* cited by examiner

METHOD FOR PRODUCING CORE-SHELL CATALYST

CROSS-REFERENCE TO RELATED APPLICATIONS

This is a national phase application based on the PCT International Patent Application No. PCT/JP2015/072469 filed Aug. 7, 2015, claiming priority to Japanese Patent Application No. 2014-204304 filed Oct. 2, 2014, the entire contents of both of which are incorporated herein by reference.

TECHNICAL FIELD

The present invention relates to a method for producing a core-shell catalyst.

BACKGROUND ART

As an electrode catalyst for fuel cells, a core-shell catalyst directed at reducing the use of a noble metal (e.g., platinum) is known.

For example, a core-shell catalyst production method is disclosed in Patent Literature 1, which produces a core-shell catalyst by displacement plating using copper underpotential deposition (Cu-UPD).

CITATION LIST

Patent Literature 1: Japanese Patent Application Laid-Open (JP-A) No. 2013-239331
Patent Literature 2: JP-A No. 2013-215701

SUMMARY OF INVENTION

Technical Problem

In the case where a palladium-containing core is used for the production of a core-shell catalyst, in order to obtain high catalytic activity, it is needed to carry out a cleaning treatment on palladium-containing particles before a Cu-UPD treatment, which is directed at the removal of impurities (e.g., oxides) from the surface of the palladium-containing particles.

The cleaning treatment has been carried out before the Cu-UPD treatment by a method of applying potential cycles to the palladium-containing particles in an acid solution using a potential control device such as a potentiostat (hereinafter the method may be referred to as potential cycle method).

FIG. 6 is a schematic perspective view of an example of a device that can be used in a conventional potential cycle method.

A device 100 shown in FIG. 6 includes a reaction container 21 in which an acid solution 22, palladium-containing particles 23 and a stirrer 24 are contained. In the reaction container 21, a working electrode 25, a counter electrode 26 and a reference electrode 27 are placed to be sufficiently immersed in the acid solution 22, and the three electrodes are electrically connected to a potential control device.

In the cleaning treatment that is carried out by the conventional potential cycle method using the device as shown in FIG. 6, a square (or triangle) wave that repeats low and high potentials is applied to the working electrode to allow the palladium-containing particles in the reaction container to collide with the working electrode; therefore, the palladium-containing particles in the reaction container are charged with a given potential instructed from the potential control device. However, since the collision frequency of the palladium-containing particles with the working electrode is very small, there is such a problem that the cleaning treatment takes a significant time to complete.

Also, the potential cycle method has the following problem: at the time of quantity synthesis of the core-shell catalyst, the cleaning treatment time dramatically increases as the amount of the palladium-containing particles subjected to the cleaning treatment increases.

The present invention was achieved in light of the above circumstance. An object of the present invention is to provide a method for producing a core-shell catalyst with high catalytic activity for a short period of time.

Solution to Problem

The core-shell catalyst production method of the present invention is a method for producing a core-shell catalyst comprising a core containing palladium and a shell containing platinum and coating the core,
the method comprising:
a supplying step of supplying palladium-containing particles and a copper-containing material to an acid solution;
a stirring step of stirring the acid solution with introducing an oxygen-containing gas into the acid solution;
a copper coating step of coating at least a part of a surface of the palladium-containing particles with copper by applying a potential that is nobler than the oxidation reduction potential of copper to the palladium-containing particles in a copper ion-containing electrolyte after the stirring step; and
a substitution step of forming the shell by substituting the copper coating at least a part of the surface of the palladium-containing particles with platinum by bringing the palladium-containing particles into contact with a platinum ion-containing solution after the copper coating step.

In the core-shell catalyst production method of the present invention, the palladium-containing particles are preferably supported on a support.

In the core-shell catalyst production method of the present invention, in the stirring step, a stirring time is preferably 15 to 30 minutes.

Advantageous Effects of Invention

According to the present invention, impurities (e.g., oxides) can be efficiently removed from the surface of the palladium-containing particles for a shorter period of time than the potential cycle method; therefore, a core-shell catalyst with high catalytic activity can be produced for a short period of time.

DESCRIPTION OF EMBODIMENTS

Figure 1:
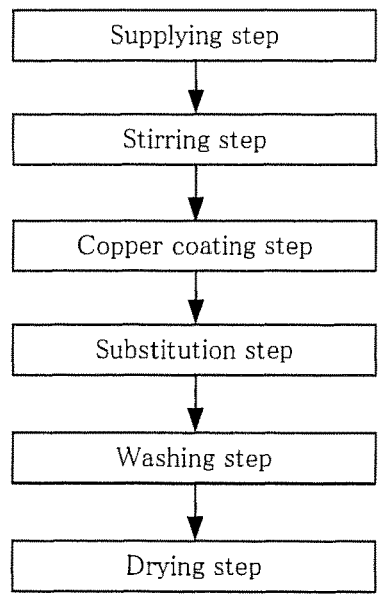
FIG. 1 is a flowchart of an example of the core-shell catalyst production method according to the present invention.

The core-shell catalyst production method of the present invention is a method for producing a core-shell catalyst comprising a core containing palladium and a shell containing platinum and coating the core, the method comprising:

a supplying step of supplying palladium-containing particles and a copper-containing material to an acid solution;

a stirring step of stirring the acid solution with introducing an oxygen-containing gas into the acid solution;

a copper coating step of coating at least a part of a surface of the palladium-containing particles with copper by applying a potential that is nobler than the oxidation reduction potential of copper to the palladium-containing particles in a copper ion-containing electrolyte after the stirring step; and a substitution step of forming the shell by substituting the copper coating at least a part of the surface of the palladium-containing particles with platinum by bringing the palladium-containing particles into contact with a platinum ion-containing solution after the copper coating step.

The reason why impurities (e.g., oxides) can be removed from the surface of the palladium-containing particles by the stirring step of the present invention, is considered as follows.

By stirring the acid solution with introducing the oxygen-containing gas in the presence of the copper-containing material, when the palladium-containing particles are brought into contact with the copper-containing material, they are charged with a low potential (a potential around the oxidation reduction potential of copper), detached from the copper-containing material and then diffused in the acid solution; meanwhile, when the palladium-containing particles are brought into contact with the oxygen introduced into the acid solution, they are charged with a high potential (a potential around the oxidation reduction potential of oxygen). By the use of the solvent in combination with the acid, a slight amount of the copper-containing material is dissolved in the acid solution and coexists with $Cu^{2+}$ ions in the acid solution. Therefore, the surface of the copper-containing material is charged with a potential that is around the oxidation reduction potential of copper.

In the stirring step, the above-described phenomenon (the collision diffusion of the palladium-containing particles floating in the acid solution) is repeated at high speed. Therefore, it is considered that impurities (e.g., oxides) can be efficiently removed from the surface of the palladium-containing particles for a shorted period of time than a potential cycle method.

Therefore, according to the present invention, since impurities (e.g., oxides) can be efficiently removed from the surface of the palladium-containing particles for a shorter period of time than a potential cycle method, a core-shell catalyst with high catalytic activity can be produced for a short period of time.

It has been difficult to apply a conventional potential cycle method to a flow type reaction container. However, since the stirring step of the present invention is applicable to not only a batch type reaction container but also a flow type reaction container, it is suitable for mass production.

In the present invention, that the shell coats the core encompasses not only a state in which the whole surface of the core is coated with the shell, but also a state in which the core surface is partly coated with the shell and is partly exposed. Also, the shell can be either a monoatomic layer or atomic layers composed of two or more stacked atoms. From the viewpoint of increasing catalytic activity, the shell is preferably a monoatomic layer.

Hereinafter, the core-shell catalyst production method of the present invention will be described in detail.

FIG. 1 is a flowchart of an example of the core-shell catalyst production method according to the present invention.

The core-shell catalyst production method of the present invention comprises (1) a supplying step, (2) a stirring step, (3) a copper coating step and (4) a substitution step. As needed, after the substitution step, the method comprises (5) a washing step, (6) a drying step, etc.

Hereinafter, the steps will be described in order.

(1) Supplying Step

The supplying step is a step of supplying palladium-containing particles and a copper-containing material to an acid solution.

As the acid solution, examples include, but are not limited to, nitric acid, sulfuric acid, perchloric acid, hydrochloric acid and hypochlorous acid. Sulfuric acid is preferred from the point of view that it has an oxidizing power that is enough to dissolve palladium.

For the concentration of the acid solution, for example, in the case of using sulfuric acid as the acid solution, the concentration of the sulfuric acid is preferably 0.001 mol/L or more, and particularly preferably 0.001 to 1.0 mol/L.

The temperature of the acid solution is not particularly limited. It is preferably 15 to 30° C.

As the palladium-containing particles that serve as the core of the core-shell catalyst, at least one kind of particles selected from palladium particles and palladium alloy particles can be used.

As the palladium alloy, examples include, but are not limited to, an alloy of palladium and a metal selected from the group consisting of iridium, ruthenium, rhodium, iron, cobalt, nickel, copper, silver and gold. The metal (other than palladium) constituting the palladium alloy may be one or more kinds of metals.

Preferably, the palladium content of the palladium alloy is 80% by mass or more of the total mass (100% by mass) of the palladium alloy. This is because a uniform platinum-containing shell can be formed when the palladium content is 80% by mass or more.

The average particle diameter of the palladium-containing particles is not particularly limited and is preferably 10 nm or less. When the average particle diameter of the palladium-containing particles is more than 10 nm, the surface area per mass of platinum decreases, and a large amount of platinum is needed to obtain necessary activity and takes a high cost. When the average particle diameter of the palladium-containing particles is too small, the palladium itself becomes more soluble and decreases the durability of the catalyst. Therefore, the average particle diameter of the palladium-containing particles is preferably 3 nm or more.

The method for calculating the average particle diameter of the particles used in the present invention is as follows. First, using a transmission electron microscope (TEM), a TEM image of the particles is taken at a magnification of 1,000,000×. Then, the diameter of a true circle having the same area as the image of one of the particles shown in the TEM image and projected onto a plane (equivalent circle particle diameter) is regarded as the diameter of the particle. Such a particle diameter measurement by the photographic observation is carried out on 500 particles of the same type, and the average of the diameters of the 500 particles is regarded as the average particle diameter. Particles that are shown on the edges of the image and cannot be fully observed, are excluded from the analysis.

Preferably, the palladium-containing particles are supported on a support. The support is not particularly limited. An electroconductive support is preferably used as the support, from the viewpoint of providing electroconductivity to the electrocatalyst layer of a fuel cell when the core-shell catalyst of the present invention is used for the electrocatalyst layer.

Examples of materials that can be used as the support for supporting the palladium-containing particles include, but are not limited to, electroconductive carbonaceous materials including carbon particles and carbon fibers, such as Ketjen Black (product name; manufactured by: Ketjen Black International Company), Vulcan (product name; manufactured by: Cabot), Norit (product name; manufactured by: Norit), Black Pearls (product name; manufactured by: Cabot) and Acetylene Black (product name; manufactured by: Chevron); metal materials including metal particles and metal fibers; and non-electroconductive materials including organic pigments, such as perylene red.

The average particle diameter of the support is not particularly limited. It is preferably 0.01 µm to hundreds of micrometers (µm) and more preferably 0.01 to 1 µm. When the average particle diameter of the support is less than the range, the support may cause corrosion degradation, and the palladium-containing particles supported on the support may be detached over time. When the average particle diameter of the support is more than the range, the specific surface area is small, and the dispersibility of the palladium-containing particles may decrease.

The specific surface area of the support is not particularly limited. It is preferably 50 to 2000 $m^2/g$ and more preferably 100 to 1600 $m^2/g$. When the specific surface area of the support is less than the range, the dispersibility of the palladium-containing particles onto the support decreases, and sufficient battery performance may not be obtained. When the specific surface area of the support is more than the range, the effective utilization rate of the palladium-containing particles decreases, and sufficient battery performance may not be obtained.

The palladium-containing particle supporting rate of the support, that is, [{("the mass of the palladium-containing particles")/("the mass of the palladium-containing particles"+"the mass of the support")}×100%], is not particularly limited. In general, it is preferably in a range of 20 to 60%. When the amount of the supported palladium-containing particles is too small, sufficient catalyst function may not be obtained. On the other hand, when the amount of the supported palladium-containing particles is too large, there may be no problem from the viewpoint of catalyst function. However, even if an excessive amount of the palladium-containing particles are supported on the support, it is difficult to obtain effects that are commensurate with an increase in production costs.

The palladium-containing particles can be supported on the support by a conventional method. As the method, examples include, but are not limited to, the following method: the palladium-containing particles are mixed with a support dispersion (in which the support is dispersed), filtered, washed, re-dispersed in ethanol or the like, and then dried using a vacuum pump or the like, thereby supporting the particles on the support. As needed, the particles may be heated after the drying. In the case of using palladium alloy particles, synthesis of the alloy and supporting of the palladium alloy particles on the support can be carried out at the same time.

The method for supplying the palladium-containing particles to the acid solution is not particularly limited. The palladium-containing particles may be added to the acid solution while the particles are in a powdery state, or the palladium-containing particles may be dispersed in a solvent to prepare a palladium-containing particle dispersion, and the palladium-containing particle dispersion may be added to the acid solution. As the solvent used to prepare the palladium-containing particle dispersion, examples include, but are not limited to, water and organic solvents. Of them, water is preferred.

From the viewpoint of carrying out the cleaning treatment for a short period of time, it is preferable to immerse the palladium-containing particles in the acid solution.

At the time of immersing the particles, it is preferable to stir the acid solution by use of an ultrasonic homogenizer, a magnetic stirrer, a motor with stirring blades, or the like.

The copper-containing material is not particularly limited, as long as it contains copper. As the copper-containing material, examples include, but are not limited to, a copper material and a copper alloy material. Of them, a copper material is preferred. As the copper material, examples include, but are not limited to, a copper wire, a copper plate, a copper mesh and a copper ball. Of them, a copper mesh is preferred from the viewpoint of increasing the contact area with the palladium-containing particles and quickly carrying out the cleaning treatment of the palladium-containing particle surface.

The shape of the copper-containing material is not particularly limited. As the shape, examples include, but are not limited to, a spherical shape, a hollow shape, a linear shape, a plate shape, a circular shape, a net shape, multidisc, and layered combinations thereof. Preferred is a shape with a size that does not disturb the stirring at the time of stirring the acid solution and with a large contact surface area.

For the copper-containing material, at least a part of the copper-containing material is needed to be in contact with the acid solution. From the viewpoint of carrying out the cleaning treatment for a short period of time, preferably, the whole copper-containing material is immersed in the acid solution.

(2) Stirring Step

The stirring step is a step of stirring the acid solution with introducing an oxygen-containing gas into the acid solution.

By the stirring step, palladium oxides and so on (impurities) can be removed from the surface of the palladium-containing particles, and the palladium-containing particles can be uniformly coated with the platinum-containing shell.

Figure 2:
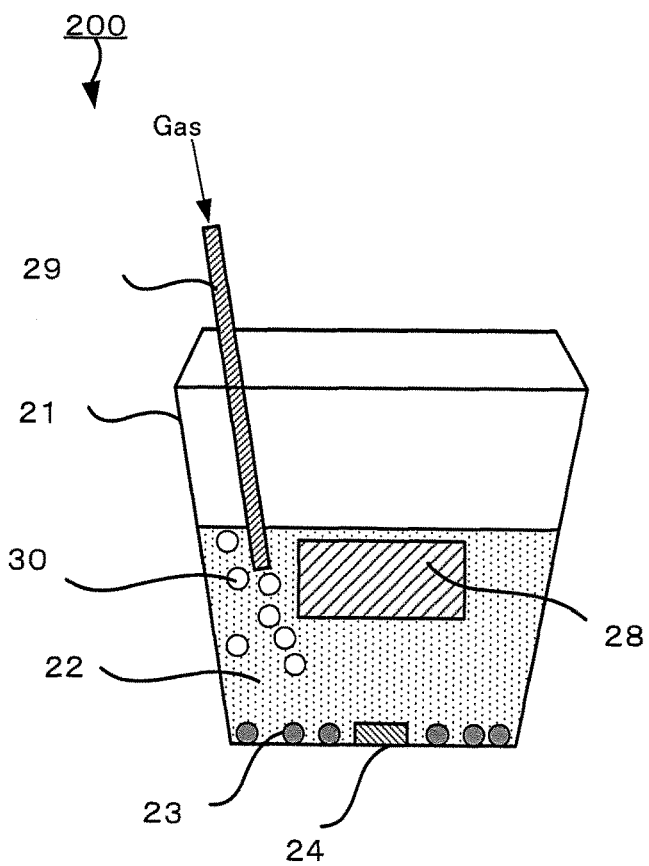
FIG. 2 is a schematic perspective view of an example of a device used in the stirring step of the present invention.

FIG. 2 is a schematic perspective view of an example of a device that can be used in the stirring step.

A device 200 shown in FIG. 2 includes a reaction container 21 in which an acid solution 22, palladium-containing particles 23 and a stirrer 24 are contained.

In the reaction container 21, a copper-containing material 28 is placed to be sufficiently immersed in the acid solution 22.

Also, a gas inlet tube 29 is placed to be immersed in the acid solution 22 so that an oxygen-containing gas can be supplied to the acid solution 22 from an oxygen-containing gas supply source (not shown) installed outside the reaction container. Circles 30 indicate bubbles of the oxygen-containing gas.

The oxygen-containing gas is not particularly limited, as long as it is a gas containing oxygen. As the oxygen-containing gas, examples include, but are not limited to, air and pure oxygen. Of them, pure oxygen is preferred.

The flow rate of the oxygen-containing gas is not particularly limited. From the viewpoint of keeping the potential of the palladium-containing particles in the acid solution constant, the flow rate is preferably 50 ml/min or more, and particularly preferably 50 to 100 ml/min.

The stirring method is not particularly limited. As the method, examples include, but are not limited to, a method using an ultrasonic homogenizer, a method using a magnetic stirrer, and a method using a motor with stirring blades.

The stirring time can be appropriately controlled depending on the type, concentration, temperature, etc., of the acid solution. It is preferably 15 to 30 minutes.

The stirring rate is not particularly limited. In the case of using a magnetic stirrer, it is preferably 200 to 1000 rpm.

When the stirring step and the below-described copper coating step are carried out in the same reaction container, the copper ion-containing electrolyte may be added to the acid solution used in the stirring step. For example, when sulfuric acid is used as the acid solution in the stirring step, the sulfuric acid used in the stirring step may be mixed with a copper sulfate aqueous solution and used in the copper coating step. Counter anions in the acid solution used in the stirring step and counter anions in the copper ion-containing electrolyte used in the copper coating step may be the same kind or different kinds of counter anions.

(3) Copper Coating Step

The copper coating step is a step of coating at least a part of a surface of the palladium-containing particles with copper by applying a potential that is nobler than the oxidation reduction potential of copper to the palladium-containing particles in a copper ion-containing electrolyte after the stirring step.

The copper ion-containing electrolyte is not particularly limited, as long as it is an electrolyte in which the surface of the palladium-containing particles can be coated with copper by Cu-UPD. The copper ion-containing electrolyte is generally composed of a solvent in which a predetermined amount of copper salt is dissolved. However, the electrolyte is not limited to this and may be an electrolyte in which part or all of the copper ions are separately present.

As the solvent used for the copper ion-containing electrolyte, examples include, but are not limited to, water and organic solvents. Water is preferred from the point of view that it does not prevent copper deposition on the surface of the palladium-containing particles.

As the copper salt used for the copper ion-containing electrolyte, examples include, but are not limited to, copper sulfate, copper nitrate, copper chloride, copper chlorite, copper perchlorate and copper oxalate.

The copper ion concentration of the electrolyte is not particularly limited and is preferably 0.01 to 1.0 mol/L.

In addition to the solvent and the copper salt, the copper ion-containing electrolyte may contain an acid, for example. Examples of acids that can be added to the copper ion-containing electrolyte include, but are not limited to, sulfuric acid, nitric acid, hydrochloric acid, chlorous acid, perchloric acid and oxalic acid. Counter anions in the copper ion-containing electrolyte and those in the acid may be the same kind or different kinds of counter anions.

It is also preferable to bubble an inert gas into the electrolyte in advance. This is because the palladium-containing particles can be inhibited from oxidation and can be uniformly coated with the platinum-containing shell. As the inert gas, nitrogen gas, argon gas or the like can be used.

The palladium-containing particles may be immersed and dispersed in the copper ion-containing electrolyte by adding the particles to the electrolyte while the particles are in a powdery state, or the palladium-containing particles may be immersed and dispersed in the copper ion-containing electrolyte by dispersing the particles in a solvent to prepare a palladium-containing particle dispersion and adding the dispersion to the copper ion-containing electrolyte. As the solvent used for the palladium-containing particle dispersion, the same solvents as those that can be used for the above-mentioned copper ion-containing electrolyte, can be used. Also, the palladium-containing particle dispersion may contain the acid that can be added to the copper ion-containing electrolyte.

Also, the palladium-containing particles may be fixed on an electroconductive substrate or working electrode, and a surface having the palladium-containing particles fixed thereon of the electroconductive substrate or working electrode may be immersed in the electrolyte. The palladium-containing particles can be fixed by the following method, for example: using an electrolyte resin (such as Nafion (trade name)) and a solvent (such as water or alcohol), a palladium-containing particle paste is prepared and applied to a surface of the electroconductive substrate or working electrode to fix the particles thereon.

The method for applying a potential to the palladium-containing particles is not particularly limited and may be a general method. As the method, examples include, but are not limited to, a method of immersing a working electrode, a counter electrode and a reference electrode in the copper ion-containing electrolyte and applying a potential to the working electrode.

As the working electrode, examples include, but are not limited to, materials that can ensure electroconductivity, such as metal materials including titanium, a platinum mesh, a platinum plate and a gold plate, and electroconductive carbonaceous materials including glassy carbon and a carbon plate. Also, the reaction container can be formed with any one of the electroconductive materials and used as the working electrode. When the reaction container is formed with any one of the metal materials and used as the working electrode, from the viewpoint of preventing corrosion, it is preferable to coat the inner wall of the reaction container with $RuO_2$. When the reaction container is formed with any one of the carbonaceous materials and used as the working electrode, the container can be used as it is without any coating.

As the counter electrode, for example, electroconductive carbon fibers or a platinum mesh plated with platinum black can be used.

As the reference electrode, for example, a reversible hydrogen electrode (RHE), a silver-silver chloride electrode or a silver-silver chloride-potassium chloride electrode can be used.

As the potential control device, for example, a potentiostat or a potentio-galvanostat can be used.

The applied potential is not particularly limited, as long as it is a potential that allows copper deposition on the surface of the palladium-containing particles, that is, as long as a potential that is nobler than the oxidation reduction potential of copper. For example, the applied potential is preferably in a range of 0.35 to 0.7 V (vs. RHE) and is particularly preferably 0.38 V (vs. RHE).

The potential applying time is not particularly limited, and it is preferably 60 minutes or more. It is more preferable to apply the potential until the reaction current becomes steady and close to zero.

The copper coating step is preferably carried out under an inert gas atmosphere such as a nitrogen atmosphere, from the viewpoint of preventing the oxidation of the surface of the palladium-containing particles or preventing the oxidation of the copper.

In the copper coating step, it is preferable to appropriately stir the copper ion-containing electrolyte, as needed. For example, in the case where the reaction container that serves as the working electrode is used and the palladium-containing particles are immersed and dispersed in the copper ion-containing electrolyte contained in the reaction container, by stirring the copper ion-containing electrolyte, the palladium-containing particles can be brought into contact with the surface of the reaction container (working electrode) and the potential can be uniformly applied to the palladium-containing particles, therefore. In this case, the stirring can be carried out continuously or intermittently during the copper coating step.

(4) Substitution Step

The substitution step is a step of forming the shell by substituting the copper coating at least a part of the surface of the palladium-containing particles with platinum by bringing the palladium-containing particles into contact with a platinum ion-containing solution after the copper coating step.

In the substitution step, by bringing the copper deposited on the surface of the palladium-containing particles into contact with a platinum ion-containing solution, the copper can be substituted with platinum due to a difference in ionization tendency.

In the present invention, the shell contains platinum and/or a platinum alloy.

As the platinum alloy, examples include, but are not limited to, an alloy of platinum and a metal material selected from the group consisting of iridium, ruthenium, rhodium, nickel and gold. The metal (other than platinum) constituting the platinum alloy may be one or more kinds of metals.

Preferably, the platinum content of the platinum alloy is 90% by mass or more of the total mass (100% by mass) of the alloy. This is because sufficient catalytic activity and durability are not obtained when the platinum content is less than 90% by mass.

A platinum salt is used for the platinum ion-containing solution. As the platinum salt, examples include, but are not limited to, $K_2PtCl_4$ and $K_2PtCl_6$. Also, an ammonia complex such as $([PtCl_4][Pt(NH_3)_4])$ may be used.

The platinum ion concentration of the platinum ion-containing solution is not particularly limited and is preferably 0.0005 to 0.1 mol/L.

The solvent that can be used for the platinum ion-containing solution can be the same solvent as that used for the above-described copper ion-containing electrolyte. In addition to the solvent and the platinum salt, the platinum ion-containing solution may contain an acid, for example. The acid can be the same acid as that used for the above-described copper ion-containing electrolyte.

The platinum ion-containing solution is sufficiently stirred in advance. From the viewpoint of preventing the oxidation of the surface of the palladium-containing particles or preventing the oxidation of the copper, it is preferable to bubble nitrogen into the solution in advance.

The temperature of the platinum ion-containing solution is not particularly limited. From the viewpoint of increasing the catalytic activity of the core-shell catalyst, it is preferably 3 to 10° C.

The substitution time (the contact time between the platinum ion-containing solution and the palladium-containing particles) is not particularly limited and is preferably 10 minutes or more. Since the potential of a reaction solution is increased by adding the platinum ion-containing solution, it is more preferable to continue the substitution until the potential monitored shows no change.

When the copper coating step and the substitution step are carried out in the same reaction container, the platinum ion-containing solution may be added to the copper ion-containing electrolyte used in the copper coating step. For example, it is allowed that after the copper coating step, the potential control is stopped, and the platinum ion-containing solution is added to the copper ion-containing electrolyte used in the copper coating step, thereby bringing the palladium-containing particles coated with copper (hereinafter may be referred to as copper-coated palladium-containing particles) into contact with the platinum ion-containing solution.

When the copper coating step and the substitution step are carried out in the same reaction container, the platinum ion concentration of the mixed solution of the platinum ion-containing solution and the copper ion-containing electrolyte containing the copper-coated palladium-containing particles, is not particularly limited. Preferably, it is 1 to 1.5 times the theoretical material amount needed to coat a geometric palladium particle surface with a monoatomic layer of platinum.

The theoretical material amount is calculated by the following method.

Figure 3:
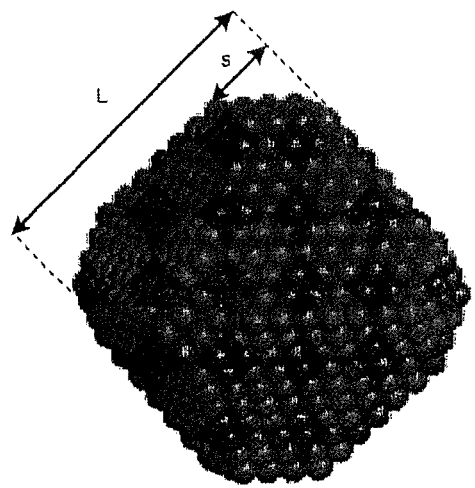
FIG. 3 is a view of a truncated octahedron.

First, spheres having the diameter of a palladium atom are arranged to form a face-centered cubic lattice, and a model structure in which a truncated octahedron as shown in FIG. 3 is formed by the arranged spheres, is devised. The truncated octahedron shown in FIG. 3 is a structure that is obtained when s/L=0.2, that is, the ratio of a side (s) of a truncated part of the octahedron to a side (L) of the octahedron, is 0.2.

Using this truncated octahedron, the total number of atoms contained in palladium particles having different particle diameters and the number of surface atoms are calculated. Then, from the ratio of the surface atoms to the total number of the atoms, the theoretical material amount needed to coat the geometric palladium surface with a monoatomic layer of platinum, is calculated. The palladium particle diameter is regarded as the distance between two opposite sides of a projected image of the truncated octahedron particle viewed from directly above.

When the palladium particle diameter is 3.2 nm, the theoretical material amount needed to coat the geometric palladium surface with a monoatomic layer of platinum is 0.34 mole of platinum with respect to 1 mole of palladium.

(5) Washing Step

The washing step is a step of washing the core-shell catalyst after the substitution step.

The washing of the core-shell catalyst is not particularly limited, as long as it is a method that can remove impurities without any damage to the core-shell structure of the core-shell catalyst thus produced. As the washing, examples include, but are not limited to, a suction filtration method using water, perchloric acid, dilute sulfuric acid, dilute nitric acid, etc.

(6) Drying Step

The drying step is a step of drying the core-shell catalyst after the substitution step.

The drying of the core-shell catalyst is not particularly limited, as long as it is a method that can remove the solvent, etc. As the method, examples include, but are not limited to, a method of keeping a temperature of 50 to 100° C. for 6 to 12 hours under an inert gas atmosphere.

As needed, the core-shell catalyst may be pulverized. The pulverizing method is not particularly limited, as long as it is a method that can pulverize solids. As the pulverization, examples include, but are not limited to, pulverization using a mortar or the like under an inert gas atmosphere or under the atmosphere, and mechanical milling using a ball mill, a turbo mill, a jet mill or the like.

EXAMPLES

Example 1

[Supplying Step]

A commercially-available palladium-supporting carbon (Pd/C) in which palladium particles having an average particle diameter of 3.2 nm are supported on carbon particles (Pd supporting rate: 30% by mass) was taken.

As an acid solution, 0.5 L of a 0.001 mol/L sulfuric acid aqueous solution was put in a reaction container. As a copper-containing material, a copper mesh was placed in the reaction container to be immersed in the sulfuric acid aqueous solution. Also, 2 g of the Pd/C was put in the reaction container and dispersed for 15 minutes with an ultrasonic homogenizer.

[Stirring Step]

Then, with introducing an oxygen gas into the reaction container at a flow rate of 100 ml/min, the sulfuric acid aqueous solution was stirred at 25° C. and 500 rpm for 15 minutes by use of a magnetic stirrer.

Figure 4:
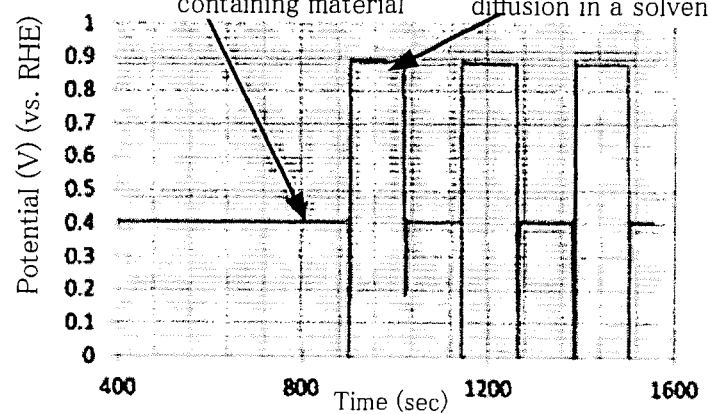
FIG. 4 is a view showing the potential behavior of Pd/C in Example 1 from the start of a dispersion treatment in a supplying step to the end of a stirring treatment in a stirring step.

FIG. 4 is a view showing the result of measuring, using a potentiostat, the potential of the Pd/C from the start of the dispersion treatment in the supplying step to the end of the stirring treatment in the stirring step.

As shown in FIG. 4, during the dispersion treatment for 15 minutes in the first half, the Pd/C was charged with a low potential (around 0.4 V (vs. RHE)) by being brought into contact with the copper mesh.

On the other hand, it is clear that during the dispersion treatment for 15 minutes in the second half, the Pd/C was charged with a low potential (around 0.4 V (vs. RHE)) when it was brought into contact with the copper mesh, and the Pd/C was charged with a high potential (around 0.9 V (vs. RHE)) when it was detached from the copper, diffused in the acid solution and brought into contact with the oxygen.

Therefore, it is clear that the potential variation of the palladium-containing particles carried out by a conventional potential cycle method using a potential control device, was efficiently carried out by the stirring treatment in the stirring step.

[Copper Coating Step]

In the reaction container, a working electrode (Cu plate), a counter electrode (platinum mesh) and a reference electrode (silver-silver chloride) were placed to be immersed in the sulfuric acid aqueous solution.

Then, with bubbling nitrogen into the sulfuric acid aqueous solution in the reaction container, copper sulfate pentahydrate was added to the sulfuric acid aqueous solution, and the copper ion concentration was set to 0.05 mol/L, thereby obtaining a copper ion-containing electrolyte.

Then, a potentiostat was connected to the working electrode, the counter electrode and the reference electrode. While the potential of the working electrode was fixed at 0.38 V (vs. RHE), the copper ion-containing electrolyte was stirred to allow the Pd/C to collide with the working electrode, thereby depositing copper on the palladium particle surface.

[Substitution Step]

With stirring the copper ion-containing electrolyte in the reaction container by the stirrer, as a platinum ion-containing solution, 0.2 L of a 0.01 mol/L $K_2PtCl_4$ solution set at 5° C. was slowly added thereto in a dropwise manner using a tube pump. After the addition of the platinum ion-containing solution was started, the stirring was continued until the self-potential in the reaction container reached a plateau (that is, until the self-potential showed no variation), thereby substituting the copper on the palladium particle surface with platinum. The $K_2PtCl_4$ solution was subjected to nitrogen bubbling in advance before it was put in the reaction container.

[Washing Step]

After the substitution step, the solution in the reaction container was filtered to collect a powder. Then, 4 L of pure water at normal temperature was added to the collected powder in ten batches to filter and wash the powder.

[Drying Step]

Then, the powder was dried at 60° C. for 12 hours and pulverized with an agate mortar and a pestle, thereby obtaining a core-shell catalyst.

Example 2

A core-shell catalyst was produced in the same manner as Example 1, except that the sulfuric acid aqueous solution was stirred for 30 minutes in the stirring step.

Comparative Example 1

A core-shell catalyst was produced in the same manner as Example 1, except that the copper-containing material was not supplied to the reaction container in the supplying step, and the introduction of the oxygen gas into the reaction container and the stirring of the sulfuric acid aqueous solution were not carried out in the subsequent stirring step.

Comparative Example 2

A core-shell catalyst was produced in the same manner as Example 1, except that the following procedures were carried out in place of the supplying step and the stirring step.

First, 2 g of the Pd/C and, as an acid solution, 0.5 L of a 0.001 mol/L sulfuric acid aqueous solution were put in a reaction container. Then, the Pd/C was dispersed by an ultrasonic homogenizer for 15 minutes to prepare a Pd/C dispersion.

Then, in the reaction container, a working electrode (glassy carbon), a counter electrode (platinum mesh) and a reference electrode (silver-silver chloride) were placed to be immersed in the Pd/C dispersion.

The reaction container was hermetically closed. Nitrogen gas was bubbled into the Pd/C dispersion to remove oxygen from the dispersion.

Then, a potentiostat was connected to the working electrode, the counter electrode and the reference electrode, and 2000 cycles of applying a potential in a triangle wave signal pattern at a potential sweep rate of 100 mV/sec in a potential range of 0.4 to 1.0 V (vs. RHE) were carried out on the working electrode to remove impurities (e.g., palladium oxides) from the palladium particle surface. The potentiostat operation time was 420 minutes. The potential of the silver-silver chloride electrode was converted to RHE and mentioned below.

[Mass Activity (MA) Evaluation]

First, 30 mg of the core-shell catalyst obtained in Example 1 was dispersed in a mixed solution of 131 μL of a 5% Nafion (trade name) dispersion, 30 mL of ultrapure water and 7.5 mL of isopropanol, thereby producing a catalyst ink. The catalyst ink was applied onto the glassy carbon electrode of a rotating disk electrode (RDE) and naturally dried. In the same manner as Example 1, catalyst inks were produced using the core-shell catalysts of Example 2 and Comparative Examples 1 and 2.

Then, an oxygen reduction reaction (ORR) measurement was carried out on the core-shell catalysts.

ORR measurement conditions are as follows.
Electrolyte: A 0.1 mol/L perchloric acid aqueous solution (saturated with oxygen by oxygen gas bubbling in advance)
Atmosphere: Under an oxygen atmosphere
Sweep rate: 10 mV/sec
Potential sweep range: 1.05 to 0.05 V (vs. RHE)
Rotational frequency: 1600 rpm From an oxygen reduction wave obtained by the ORR measurement, the catalytic activity per unit mass of platinum (hereinafter may be referred to as platinum mass activity) of each core-shell catalyst was measured.

More specifically, current values at 0.9 V (vs. RHE) and 0.35 V (vs. RHE) in the second cycle of the oxygen reduction wave obtained by the ORR measurement, were considered as an oxygen reduction current ($I_{0.9}$) and a diffusion limited current ($I_{lim}$), respectively; an activation controlled current (Ik) was obtained from the below-mentioned formula (1); and the Ik (A) was divided by the platinum amount (g) contained in the core-shell catalyst applied onto the glassy carbon electrode, thereby calculating the catalytic activity (A/g-Pt) per unit mass of platinum.

$$Ik=(I_{lim} \times I_{0.9})/I_{lim}-I_{0.9})$$ [Formula (1)]

The meanings of the symbols in the formula (1) are as follows:
Ik: Activation controlled current (A)
$I_{lim}$: Diffusion limited current (A)
$I_{0.9}$: Oxygen reduction current (A)

The platinum mass activity measurement results are shown in Table 1.

As shown in Table 1, the platinum mass activities of the core-shell catalysts are as follows: 795 A/g-Pt in Example 1, 770 A/g-Pt in Example 2, 674 A/g-Pt in Comparative Example 1, and 720 A/g-Pt in Comparative Example 2.

[Electrochemical Surface Area (ECSA)]

A cyclic voltammetry (CV) measurement was carried out on the core-shell catalysts obtained in Examples 1 and 2 and Comparative Examples 1 and 2, and the electrochemical surface areas (ECSA) of the core-shell catalysts were calculated.

More specifically, in the same manner as the above-mentioned mass activity evaluation, a catalyst ink was prepared, applied onto a glassy carbon electrode (RDE) and dried. Then, the CV measurement was carried out.

CV measurement conditions are as follows.
Electrolyte: A 0.1 M perchloric acid aqueous solution (saturated with Ar by Ar gas bubbling in advance at 30 mL/min for 30 minutes or more)
Atmosphere: Under an Ar atmosphere
Sweep rate: 50 mV/sec
Potential sweep range: 0.05 to 1.2 V (vs. RHE)

From a cyclic voltammogram thus obtained, hydrogen desorption peaks were integrated to obtain a charge amount (C).

From the concentration and amount of the catalyst ink applied to the glassy carbon electrode, the mass (g) of the palladium was calculated.

The electrochemical surface area ($m^2$/g-Pt) was calculated from the value obtained by dividing the charge amount (C) obtained from the hydrogen desorption peaks by the charge amount ($C/m^2$) per unit active surface area of platinum and the mass (g) of platinum.

The electrochemical surface area calculation results are shown in Table 1.

As shown in Table 1, the electrochemical surface areas of the core-shell catalysts are as follows: 173 $m^2$/g-Pt in Example 1, 171 $m^2$/g-Pt in Example 2, 169 $m^2$/g-Pt in Comparative Example 1, and 171 $m^2$/g-Pt in Comparative Example 2.

[Specific Activity (SA)]

For the core-shell catalysts obtained in Examples 1 and 2 and Comparative Examples 1 and 2, the specific activity (the catalytic activity per surface area of platinum ($A/m^2$)) was calculated by dividing the catalytic activity per unit mass of platinum (A/g-Pt) by the electrochemical surface area of platinum ($m^2$/g-Pt). The results are shown in Table 1.

As shown in Table 1, the specific activities of the core-shell catalysts are as follows: 4.60 $A/m^2$ in Example 1, 4.50 $A/m^2$ in Example 2, 3.99 $A/m^2$ in Comparative Example 1, and 4.21 $A/m^2$ in Comparative Example 2.

TABLE 1

| | Electrochemical surface area ($m^2$/g-Pt) | Catalytic activity (A/g-pt) | Specific activity ($A/m^2$) | Pd cleaning treatment time (min) |
|---|---|---|---|---|
| Example 1 | 173 | 795 | 4.60 | 15 |
| Example 2 | 171 | 770 | 4.50 | 30 |
| Comparative Example 1 | 169 | 674 | 3.99 | — |
| Comparative Example 2 | 171 | 720 | 4.21 | 420 |

[Comparison to Conventional Methods]

Figure 5:
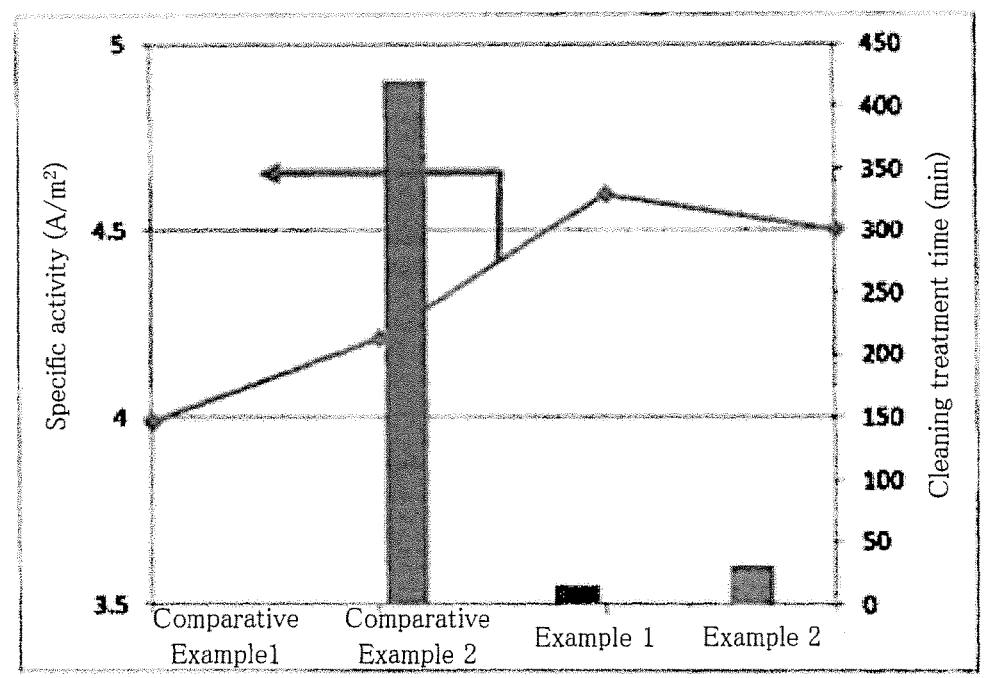
FIG. 5 is a view showing a relationship between the cleaning treatment time and the specific activity of the core-shell catalyst.
Figure 6:
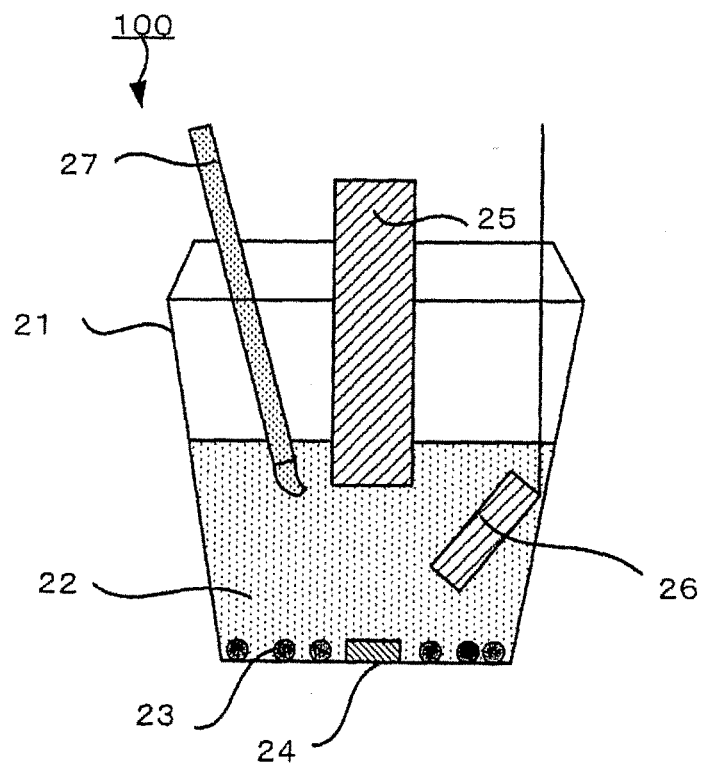
FIG. 6 is a schematic perspective view of an example of a device that is used in a conventional potential cycle method.

For the core-shell catalysts obtained in Examples 1 and 2 and Comparative Examples 1 and 2, a relationship between the specific activity ($A/m^2$) and the time needed for the cleaning treatment of the palladium particle surface, is shown in FIG. 5.

For Comparative Example 1 in which the cleaning treatment of the palladium particle surface was not carried out, it is considered that impurities (e.g., palladium oxides) were not removed from the palladium particle surface, and the palladium particle surface was not sufficiently coated with copper in the copper coating step. Therefore, it is considered that as shown in Table 1 and FIG. 5, the specific activity (SA) became low.

For Comparative Example 2 in which the potential control by the potentiostat (the potential cycle method) was carried out, it is clear that although the specific activity increased by about 6% compared to Comparative Example 1, the cleaning treatment of the palladium particle surface took as long as 420 minutes.

For Examples 1 and 2, it was confirmed that although the stirring in the stirring step was carried out for a very short time (15 to 30 minutes), the specific activity increased by 13 to 15% compared to Comparative Example 1.

As a result of comparing Examples 1 and 2 to Comparative Example 2, it was confirmed that although there is almost no difference between the electrochemical surface areas of the core-shell catalysts, the specific activities of Examples 1 and 2 increased by 7 to 9% compared to Comparative Example 2.

Therefore, it can be said that by the stirring step of the present invention, impurities (e.g., palladium oxides) could be efficiently removed from the palladium particle surface for a shorter period of time than the potential cycle method and, as a result, the core-shell catalyst with high catalytic activity could be produced for a short period of time.

REFERENCE SIGNS LIST

21. Reaction container
22. Acid solution
23. Palladium-containing particles
24. Stirrer
25. Working electrode
26. Counter electrode
27. Reference electrode
28. Copper-containing material
29. Gas inlet tube
30. Circles
100. Device
200. Device

What is claimed is:

1. A method for producing a core-shell catalyst comprising a core containing palladium and a shell containing platinum and coating the core,
   the method comprising:
   a supplying step of supplying palladium-containing particles and a copper-containing material to an acid solution;
   a stirring step of stirring the acid solution with introducing an oxygen-containing gas into the acid solution to obtain a copper ion-containing electrolyte;
   a copper coating step of coating at least a part of a surface of the palladium-containing particles with copper by applying a potential that is nobler than the oxidation reduction potential of copper to the palladium-containing particles in the copper ion-containing electrolyte after the stirring step; and
   a substitution step of forming the shell by substituting the copper coating at least a part of the surface of the palladium-containing particles with platinum by bringing the palladium-containing particles into contact with a platinum ion-containing solution after the copper coating step.

2. The method for producing the core-shell catalyst according to claim 1, wherein the palladium-containing particles are supported on a support.

3. The method for producing the core-shell catalyst according to claim 1, wherein, in the stirring step, a stirring time is 15 to 30 minutes.

* * * * *